US007589723B2

(12) United States Patent
Wang et al.

(10) Patent No.: US 7,589,723 B2
(45) Date of Patent: Sep. 15, 2009

(54) REAL-TIME RENDERING OF PARTIALLY TRANSLUCENT OBJECTS

(75) Inventors: Lifeng Wang, Beijing (CN); Xu Yang, Tianjin (CN); Baining Guo, Beijing (CN); Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 11/189,491

(22) Filed: Jul. 25, 2005

(65) Prior Publication Data

US 2007/0018996 A1     Jan. 25, 2007

(51) Int. Cl.
*G06T 15/50* (2006.01)
*G06T 15/60* (2006.01)
*G09G 5/00* (2006.01)

(52) U.S. Cl. .................................. 345/426; 345/582
(58) Field of Classification Search ............... 345/426, 345/592
See application file for complete search history.

(56) References Cited

U.S. PATENT DOCUMENTS 7,319,467 B2 *   1/2008   Weyrich et al. ............ 345/426

OTHER PUBLICATIONS

"Efficiently Simulating Scattering of Light by Leaves"; Baranoski et al.; The Visual Computer; 2001.*
Hanrahan, Pat and Krueger, Wolfgang. Reflection from Layered Surfaces due to Subsurface Scattering. Proceedings of the 20$^{th}$ Annual Conference on Computer Graphics and Interactive Techniques. 1993. p. 165-174.*

* cited by examiner

*Primary Examiner*—Kee M Tung
*Assistant Examiner*—Jacinta Crawford
(74) *Attorney, Agent, or Firm*—Lee & Hayes, PLLC

(57) ABSTRACT

Rendering of a partially translucent object is performed using a set of parameter maps derived from data measuring reflectance and transmittance of light received at the surface of the partially translucent object. Data is captured from an actual object being modeled, rather than estimated based on internal structure and composition. Parameter maps relating albedo, thickness variation, and specular intensity and roughness are stored as textures to facilitate rendering. In addition, realistic illumination from high energy sources such as sunlight is effected by separating light into low frequency and high frequency components. Low frequency components are rendered by precomputed radiance transfer. High frequency components, which are not modeled well by precomputed radiance transfer, are modeled using a light visibility convolution integral to generate light visibility maps for positions of the high frequency light source. Contributions from the different frequency components are combined to yield a realistic appearance.

12 Claims, 10 Drawing Sheets

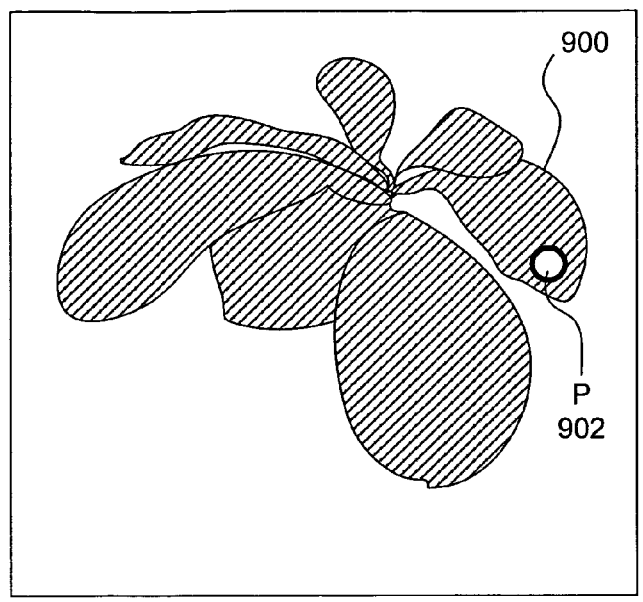
FIGURE 9
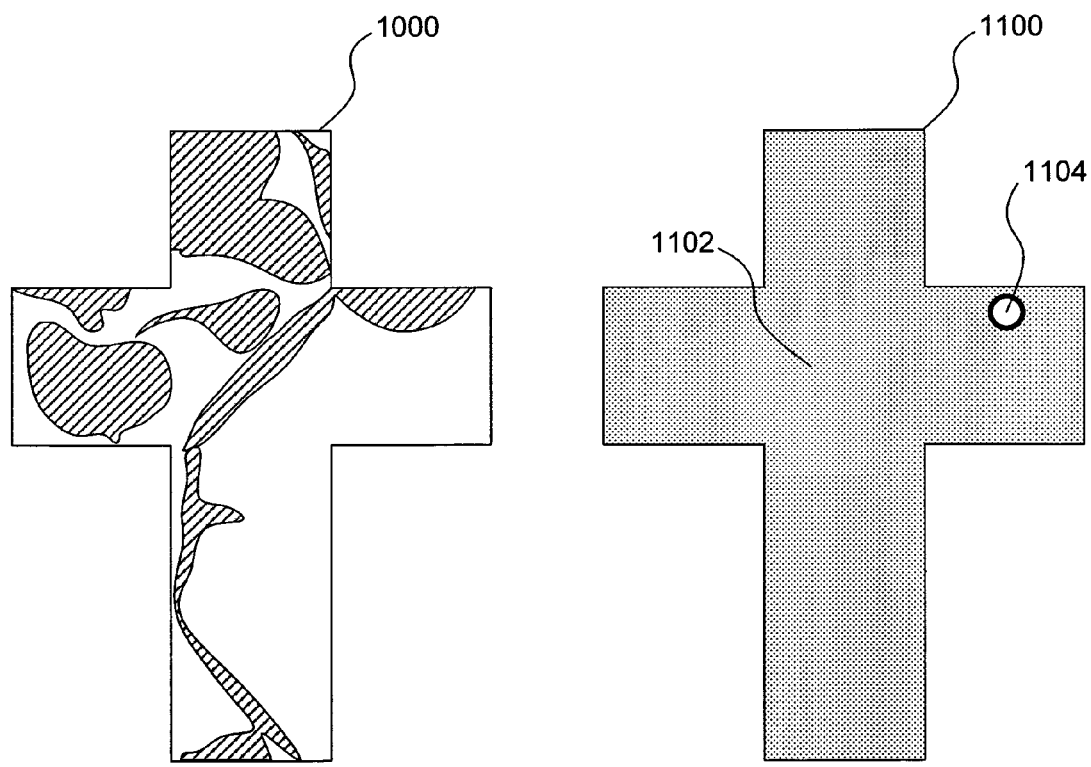
FIGURE 10  FIGURE 11

REAL-TIME RENDERING OF PARTIALLY TRANSLUCENT OBJECTS

BACKGROUND

Improving graphics display technologies provide for highly realistic rendering of images in simulated environments such as games. Even modestly priced graphics adapters and gaming systems can render remarkably realistic scenes.

Notwithstanding the high capability of graphics hardware, realistic rendering of outdoor settings continues to present a challenge. For example, in rendering a daylight setting involving a number of plants, a system must represent how sunlight and shadow contribute to the appearance of the plants. Realistically representing leaves is particularly difficult because of the complex underlying structures of leaves that affect how leaves reflect and transmit light. Leaves are partially translucent as a function of their physical and biochemical structures. The degree to which a leaf reflects, scatters, or transmits light not only varies from plant to plant, but varies across the surface of the leaf because of variations in thickness and other characteristics.

Many efforts to render leaves rely on using bidirectional reflectance distribution functions (BRDFs) and bidirectional transmittance distribution functions (BTDF). BRDFs and BTDFs capture the translucence of leaves by modeling the reflectance and transmission of light for individual leaves as a two-dimensional function of each point of a leaf relative to that point's position on the leaf surface. Some BRDF/BTDF models have been devised based on geometrical and biochemical analyses of leaf samples. Developing these models requires detailed knowledge of internal leaf structures, and the resulting models frequently yield large data files.

To avoid this level of complexity, more compact models have been generated based on experimental data related to inorganic materials. These models are easier to create and require less data storage, but fail to accurately represent the subsurface scattering that allows for realistic rendering.

Even if a leaf can be rendered realistically, realistically representing how a leaf is illuminated by direct sunlight, reflections, shadows, and other environmental light represents an entirely different problem. Because of the way that leaves are bunched together, accurate depiction of how leaves are illuminated by sunlight involves detailed ray tracing. Ray tracing generally does not support the fast run-time shading calculations desired to render leaves in real time.

Other lighting calculation solutions, such as precomputed radiance transfer (PRT) can calculate illumination more quickly than ray tracing. However, PRT is much better suited to modeling low energy, low frequency lights, such as man-made indoor lighting, than it is for high energy, high frequency lighting such as sunlight. Using PRT to model sunlight tends to do a poor job of representing shadows and other illumination details resulting from high-frequency illumination.

SUMMARY

Rendering of a partially translucent object is performed using a set of parameter maps derived from data measuring reflectance and transmittance of light received at the surface of the partially translucent object. Data is captured from an actual object being modeled, rather than estimated based on internal structure and composition. Parameter maps relating albedo, thickness variation, and specular intensity and roughness of the object are stored as textures to facilitate rendering. In addition, realistic rendering of illumination from high energy sources such as sunlight is effected by separating illumination into low frequency and high frequency components. Low frequency components are rendered by precomputed radiance transfer. High frequency components, which are not modeled well by precomputed radiance transfer, are modeled using a light visibility convolution integral to generate light visibility maps for positions of the high frequency light source. The different frequency components are combined to yield a realistic appearance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number identifies the figure in which the reference number first appears, while the left-most two digits of a four-digit reference number identifies the figure in which the reference number first appears. The use of the same reference numbers in different figures indicates similar or identical items.

FIG. 9 is a mesh representing a group of leaves for which illumination is to be calculated.

FIG. 10 is a cube map for the group of leaves of FIG. 8.

FIG. 11 is a light mask used to represent the high frequency illumination source that can be combined with the cube map of FIG. 9 to generate a light visibility convolution integral.

DETAILED DESCRIPTION

Embodiments of object modeling, light computation, and object rendering are adaptable for use with non-fluid, partially translucent objects. As illustrated in the exemplary embodiments described below, plant leaves and other objects that partially reflect and partially transmit light, can be realistically modeled using data measured from actual objects, such as actual plant leaves. Reflectance and transmittance functions are adapted to the data measured. Using the reflectance and transmittance functions, parameter maps describing the object are derived and stored as textures used in rendering the object.

In addition, illumination is separately calculated for low frequency light sources, such as reflected sunlight and other environmental light, and high frequency light, such as direct sunlight. By calculating the illumination in two separate passes, light computation is performed quickly without loss of shadows and other effects resulting from high frequency light sources.

Process of Object Rendering

Modes of object modeling, light computation, and object rendering are useful for real-time rendering of any non-fluid, partially translucent object. The following sections of this detailed description will describe operation of modes for an example of plant leaves. Plant leaves are a suitable example because leaves are complex objects for which realistic rendering is desired, and plant leaves are desirable objects to include in a simulated outdoor environment. However, modes described below are also useful for modeling and rendering other translucent objects.

Figure 1:
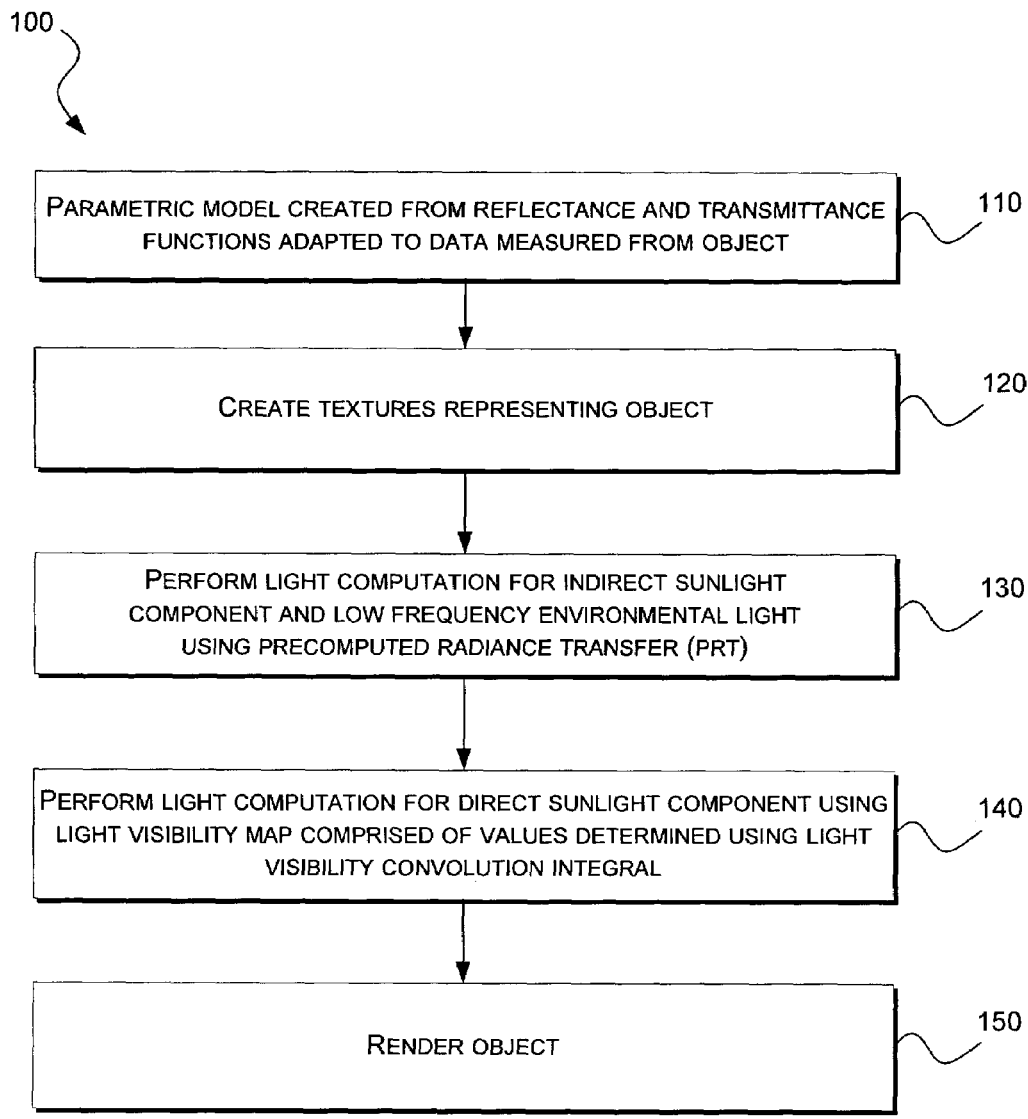
FIG. 1 is a generalized flow diagram of a process for modeling and calculating illumination used in rendering objects.

FIG. 1 illustrates a generalized flow diagram of a process 100 to facilitate object rendering. Aspects of the process 100 are explained in more detail in the following sections of this detailed description.

At 110, a parametric model of the object is created from reflectance and transmittance functions adapted to data measured from an object to be rendered. In one mode, the object is modeled with two pairs of bidirectional reflectance distribution functions (BRDFs) and bidirectional transmittance distribution functions (BTDFs) derived from captured video data of the object. A first BRDF/BTDF pair is created for the top surface of the leaf, and a second BRDF/BTDF pair is created for the bottom surface of the leaf. Each of the BTDFs relies on a thickness detail map of the object. In addition, each BRDF relies on three object maps: an albedo map, a specular roughness map, and a specular intensity map.

At 120, textures are created from the maps derived at 110. More specifically, the maps are stored as red-green-blue-alpha (RGBA) textures that may be stored in memory of the graphics device for rapid, real-time rendering of the object.

At 130 and 140, light computation is performed to facilitate rendering the object with global illumination effects. In one mode of light computation further described below, a two-pass process is used. At 130, in the first pass, precomputed radiance transfer (PRT) is used to compute indirect and low frequency lighting components. At 140, in the second pass, the contribution of direct lighting components is computed using pre-computed light visibility convolution (LVC) data for all vertices from which the direct lighting may issue.

At 140, using the textures and the two-pass light computation, the object is rendered in real-time.

Framework for Object Modeling

Figure 2:
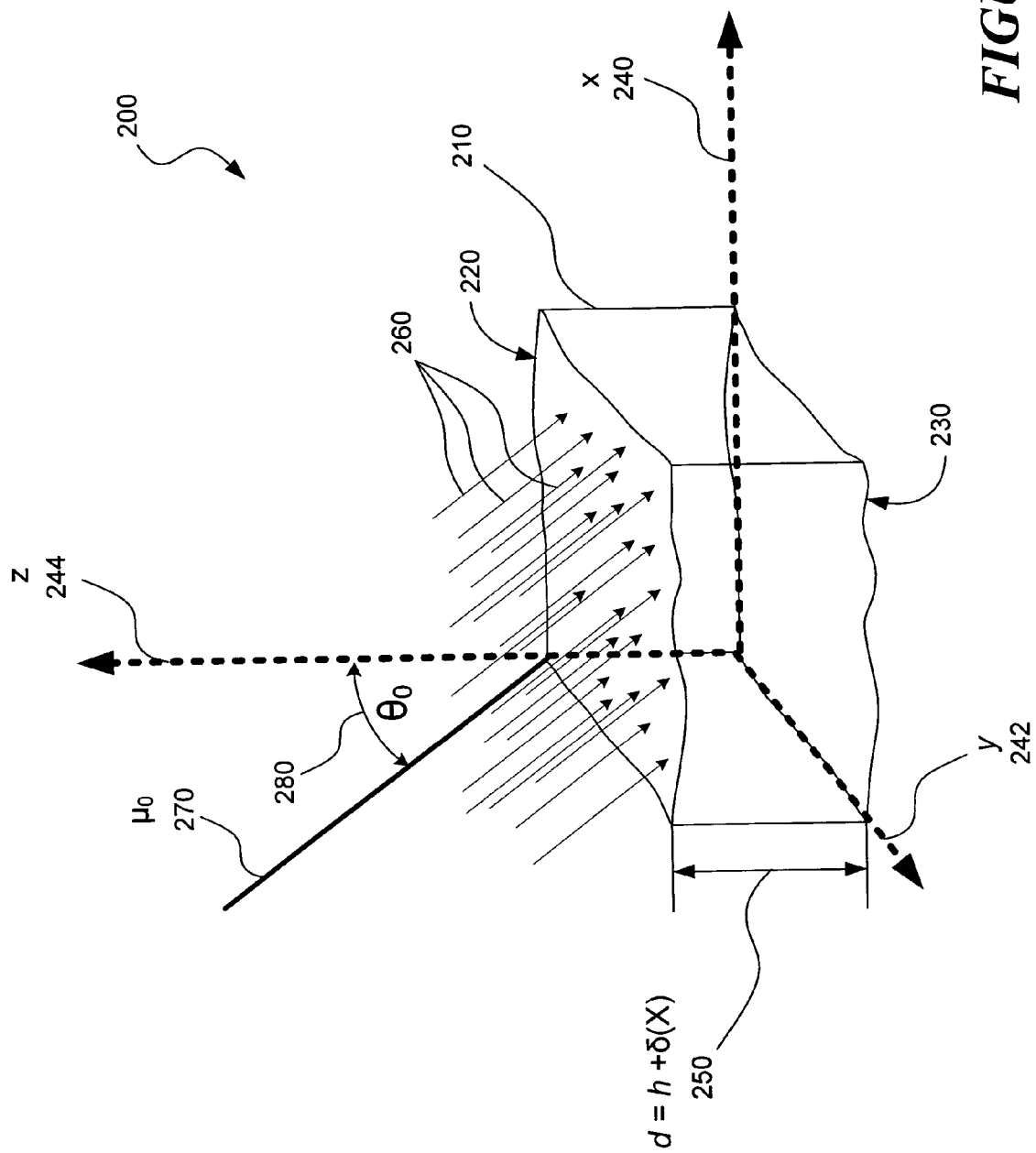
FIG. 2 is a portion of an object, such as a leaf, situated in a coordinate space and receiving illumination from an illumination source.
Figure 3:
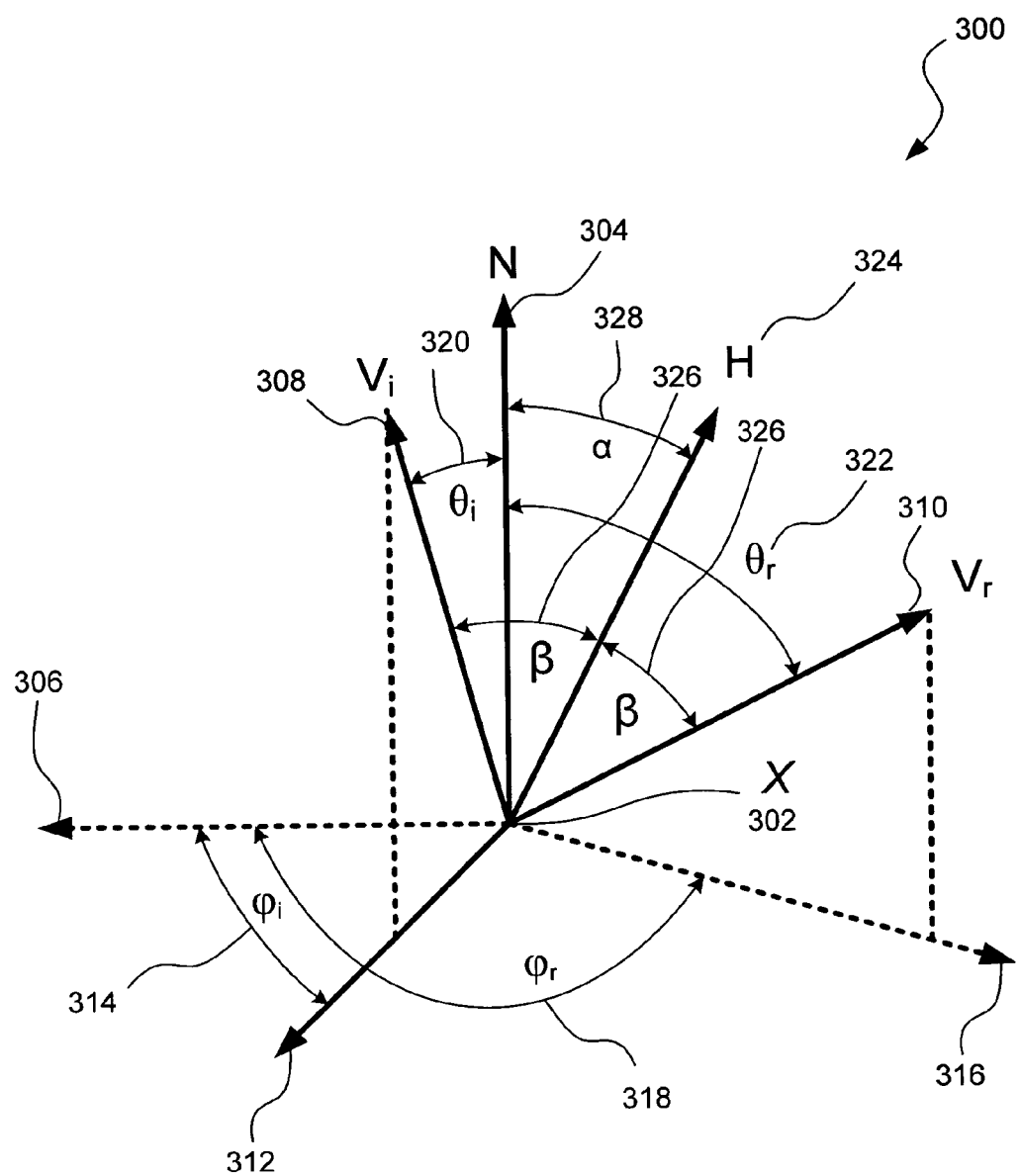
FIG. 3 is detailed coordinate system showing parameters used in deriving the functions used to model objects.

FIGS. 2 and 3 illustrate frames of reference used in modeling the object. The visual characteristics of the plant leaf may vary with position in a plane of the slab and thickness of the slab perpendicular to that plane. The appearance in response to illumination also may vary depending on the angles of incidence and reflectance of illumination applied to the leaf.

FIG. 2 represents a basic model 200 of a leaf. The leaf is modeled as a homogenous leaf slab 210 having a rough upper surface 220 and a rough lower surface 230. The leaf slab 210 is situated in a three-dimensional coordinate space. The leaf slab 210 lies in a plane defined by an x-axis 240 and y-axis 242 that is generally parallel with both the upper surface 220 and the lower surface 230 of the leaf slab 210. A z-axis 244 is perpendicular to the plane defined by the x-axis 240 and the y-axis 242.

The thickness d 250 of the leaf slap 210 lies along the z-axis 244. More specifically, the thickness d 250 of the leaf slab 210 is defined as a function given by Eq. 1:

$$d = h + \delta(X) \quad (1)$$

As used in Eq. 1, X represents the (x, y) spatial position on the leaf slab 210 in the plane defined by the x-axis 240 and the y-axis 242. The thickness d 250 is a spatially variant function relative to an overall object thickness h. The thickness detail map representing a collection of values of thickness d 250 is included within the bidirectional transfer distribution function (BTDF) for both the upper surface and the lower surface of the leaf. The value of h can be adjusted by a user to later adjust the appearance of leaf as desired.

Rays of light 260 illuminate the upper surface 220 of the leaf slab 210, with the rays 260 representing the illumination caused by light beam $\mu_0$ 270. The light beam $\mu_{0,2}$ 70 emanates from an angular position $\theta_0$ 280 relative to the z-axis 250, which represents a normal axis to the surfaces 220 and 230 of the leaf slab 210.

FIG. 3 illustrates a more detailed coordinate system 300 used in developing a model of a leaf slab 210 (FIG. 2) or another object centered around a point of interest X 302. N 304 is a normal to the surface of an object (not shown) extending from point X 302. Reference axis 306 is used in determining angles of incidence and reflectance as described further below. $V_{i,3}$ 08 is a vector extending between X 302 and a source of the illumination. $V_{r,3}$ 10 is a vector representing a direction of reflection of light from P 302.

Between a projection 312 into the plane in which the object lies and the reference axis 306 is $\phi_i$ 314, a horizontal angle of incidence. Between a projection 312 into the plane in which the object lies and the reference axis 306 is $\phi_r$ 318, a horizontal angle of reflectance. Similarly, between $V_i$ 308 and the normal 304 is $\theta_i$ 320, a vertical angle of incidence. Between $V_r$ 310 and the normal 304 is $\theta_r$ 322, a vertical angle of incidence.

A half-vector H 324 bisects an angle between vector $V_{i,3}$ 08 and vector $V_{r,3}$ 10, splitting the angle into two equal angles β 326. Between H 324 and N 304 is α 328. The angles identified in connection with FIG. 3 are used in deriving and applying the parametric models used in modeling the object.

Overview of Parametric Object Modeling

As previously described, in one mode of parametrically modeling a leaf, the model consists of two pairs of BRDFs and BTDFs. A first BRDF/BTDF pair is created for the top surface of the leaf, and a second BRDF/BTDF pair is created for the bottom surface of the leaf. Each of the BTDFs relies on a thickness detail map. In addition, each BRDF relies on three object maps: an albedo map, a specular roughness map, and a specular intensity map. These four maps are stored as red-green-blue-alpha (RGBA) textures that are stored in memory of the graphics device for rapid, real-time rendering of the object. In one mode, the maps are derived by measuring the object to be modeled. More specifically, the albedo, specular roughness, and specular intensity maps are derived from captured visual data of the object to be modeled.

Derivation of BRDF

In one mode, the BRDF is represented by $f_r$. The BRDF $f_r$ includes two terms: a diffuse term $f_d$ and a glossy term $f_s$ as given by Eq. 2:

$$f_r(X, \theta_i, \phi_i, \theta_r, \phi_r) = f_s(X, \theta_i, \phi_i, \theta_r, \phi_r) + f_d(X) \quad (2)$$

As indicated by Eq. 2, the BRDF as a whole is spatially variant as a function of position X within the plane of the object, the angles of incidence of the illumination source $\theta_i$ and $\phi_i$, and the angles of reflection $\theta_r$ and $\phi_r$. However, while the glossy term $f_s$ is dependent on each of these spatial parameters, the diffuse term $f_d$ is dependent only on the position within the plane of the object.

More specifically, the spatially variant BRDF, $f_r(X, \theta_i, \phi_i, \theta_r, \phi_r)$, is given by Eq. 3:

$$f_r(X, \theta_i, \varphi_i, \theta_r, \varphi_r) = \frac{\rho_S(X)}{\cos\theta_i \cos\theta_r \cos^4\alpha} \cdot \frac{\exp\left(\frac{-\tan^2\alpha}{m(X)^2}\right)}{4\pi m(X)^2} + \frac{A}{2\pi} \frac{\sigma_S}{\sigma_a + \sigma_S} \gamma(X) \quad (3)$$

The derivation of the glossy term $f_s$ and the diffuse term $f_d$ of the BRDF are described in the following sections.

Derivation of Glossy Term of BRDF

The glossy term $f_s$ is derived from analysis of rough surface scattering resulting from the upper surface 220 (FIG. 2) and lower surface 230 of the leaf slab 210. As is understood in the art, illumination incident on a rough surface is scattered in various directions. In the case of a leaf, the surface roughness is large compared to the wavelength of the incident light. Thus, the surfaces undulate at a relatively large scale, and the scattering of light can be derived using Kirchoff's rough surface scattering theory as given by Eq. 4:

$$\sigma_k^0 = \frac{l^2(1 + \cos\theta_i\cos\theta_r + \sin\theta_i\sin\theta_r\cos(\varphi_r - \varphi_i))^2}{(\cos\theta_i + \cos\theta_r)^4 \sigma^2} \cdot \exp\left(-\frac{l^2(\sin^2\theta_i + \sin^2\theta_r + 2\sin\theta_i\sin\theta_r\cos(\varphi_r - \varphi_i))}{4 2(\cos\theta_i + \cos\theta_r)^2}\right) \quad (4)$$

In Eq. 4, is the correlation length and $\sigma$ is the root mean square height.

Using identities and known equations, Eq. 4 can be simplified. Referring back to the coordinate system of FIG. 3 the relationship of $\alpha$, $\beta$, $\theta_i$ and $\theta_r$ can be rewritten according to a system of equations of Eqs. 5-8:

$$V_i + V_r = |V_i + V_r|H = (2\cos\beta)H \quad (5)$$

$$\cos\theta_i + \cos\theta_r = (V_i + V_r) \cdot N = (2\cos\beta)H \quad (6)$$

$$(2\cos\beta)H = 2\cos\beta\cos\alpha \quad (7)$$

$$\frac{\cos\theta_i + \cos\theta_r}{2\cos\beta} = \cos\alpha \quad (8)$$

Further, because the angle between $V_i$ 308 (FIG. 3) and $V_r$ 310 is equal to $2\beta$, the product of $V_i$ 308 and $V_r$ 310 is reexpressible according to Eqs. 9 and 10:

$$V_i \cdot V_r = \cos(2\beta) \quad (9)$$

$$V_i \cdot V_r = 2\cos^2\beta - 1 \quad (10)$$

From the trigonometry of the coordinate system 300, values of $V_i$ 308 and $V_r$ 310 are replaceable with identities given by Eqs. 11 and 12:

$$V_i = (\sin\theta_i \cos\phi_i, \sin\theta_i \sin\phi_i, \cos\theta_i) \quad (11)$$

$$V_r = (\sin\theta_r \cos\phi_r, \sin\theta_r \sin\phi_r, \cos\theta_r) \quad (12)$$

Use of these identities yields Eqs. 13:

$$\cos\theta_i \cos\theta_r + \sin\theta_i \sin\theta_r \cos(\phi_i - \phi_r) = V_i \cdot V_r \quad (13)$$

From Eqs. 10 and 13, the relationships can be further simplified as given by Eqs. 14 and 15:

$$\sin^2\theta_i + \sin^2\theta_r + 2\sin\theta_i\sin\theta_r\cos(\varphi_i - \varphi_r) \quad (14)$$

$$= 2 - (\cos^2\theta_i + \cos^2\theta_r + 2\cos\theta_i\cos\theta_r) +$$

$$2[\cos\theta_i\cos\theta_r + \sin\theta_i\sin\theta_r\cos(\varphi_i - \varphi_r)]$$

$$= 4\cos^2\beta - (\cos\theta_i + \cos\theta_r)^2 \quad (15)$$

The glossy term $f_s$ of the BDRF using a normalized scattering cross-section per unit area formula, as developed by Stogryn in the 1967 paper "Electromagnetic Scattering from Rough, Finitely Conducting Surface," Radio Sciences 2 (New Series), 4, 415-428, is given by Eq. 16:

$$\sigma_k^0 = \frac{l^2[1 + \cos\theta_i\cos\theta_r + \sin\theta_i\sin\theta_r\cos(\varphi_r - \varphi_i)]^2}{[\cos\theta_i + \cos\theta_r]^4 \sigma^2} \cdot \exp\left\{-\frac{l^2[\sin^2\theta_i + \sin^2\theta_r + 2\sin\theta_i\sin\theta_r\cos(\varphi_r - \varphi_i)]}{4\sigma^2[\cos\theta_i + \cos\theta_r]^2}\right\} \quad (16)$$

Using Eqs. 13-15, the normalized scattering cross-section formula may be reexpressed as given by Eqs. 17 and 18:

$$\sigma_k^0 = \frac{l^2[1 + 2\cos^2\beta - 1]^2}{[\cos\theta_i + \cos\theta_r]^4 \sigma^2} \cdot \exp\left\{-\frac{l^2[4\cos^2\beta - (\cos\theta_i + \cos\theta_r)^2]}{4\sigma^2[\cos\theta_i + \cos\theta_r]^2}\right\} \quad (17)$$

$$\sigma_k^0 = \frac{l^2}{4\sigma^2}\left(\frac{2\cos\beta}{\cos\theta_i + \cos\theta_r}\right)^4 \cdot \exp\left\{-\frac{l^2}{4\sigma^2}\left[\left(\frac{2\cos\beta}{\cos\theta_i + \cos\theta_r}\right)^2 - 1\right]\right\} \quad (18)$$

The specular roughness map is defined by spatially variant function m(X) included in the glossy term $f_s$ of the BRDF. The function m(X) represents the root mean square slope of the microfacets at point X as given by Eq. 19:

$$m(X) = \frac{2\sigma}{l} \quad (19)$$

Substituting m(X) according to Eq. 19, and substituting cos $\alpha$ according to Eq. 8, Eq. 18 can be further reduced as given by Eqs. 20 and 21:

$$\sigma_k^0 = \frac{l^2}{4\sigma^2\cos^4\alpha} \cdot \exp\left\{-\frac{l^2}{4\sigma^2}\left[\frac{1}{\cos^2\alpha} - 1\right]\right\} \quad (20)$$

$$\sigma_k^0 = \frac{1}{m(X)^2\cos^4\alpha} \cdot \exp\left\{-\frac{\tan^2\alpha}{m(X)^2}\right\} \quad (21)$$

Using Eq. 21, the glossy term $f_s$ is given by Eq. 22:

$$f_s(X, \theta_i, \varphi_i, \theta_r, \varphi_r) = \frac{\rho_S(X)}{\cos\theta_i\cos\theta_r\cos^4\alpha} \cdot \frac{\exp\left(\frac{-\tan^2\alpha}{m(X)^2}\right)}{4\pi m(X)^2} \quad (22)$$

In Eq. 22, $\rho_s(X)$ represents the spatially variant specular intensity map which, like the specular roughness map m(X) is derivable from visual data captured from the object being modeled, as is further described below. Thus, in one mode of object modeling as expressed in Eq. 22, the glossy term of the BRDF is expressed in terms of the specular roughness map m(X), the spatial intensity map $\rho_s(X)$, angle $\alpha$ 328 (FIG. 3), angle $\theta_i$ 320 and angle $\theta_r$ 322.

Derivation of Diffuse Term of BRDF

Unlike the glossy term $f_s$ of the BRDF, the diffuse term $f_d$ of the BRDF is not a function of the angles of incidence or reflectance of the illumination coordinates. The diffuse term $f_d$ is only a function of position in the plane of the leaf slab 210 (FIG. 2). The diffuse term $f_d$ is based only on a diffuse reflectance that is a function of the subsurface light transport, as given by Eq. 23:

$$f_d(X) = \frac{1}{\pi}\rho_d(X) \quad (23)$$

In Eq. 23, $\rho_d(X)$ is the diffuse reflectance, obtainable from analysis of subsurface light transport, as described further below.

Derivation of BTDF

In one mode, the BTDF is represented by $f_t$. The BTDF $f_t$, in contrast to the BRDF's dual glossy and diffuse terms, includes only a diffuse term, as given by Eq. 24:

$$f_t(X) = \frac{1}{\pi}e^{-(\sigma_a+\sigma_s)(h+\delta(X))} + \frac{B}{2\pi}\frac{\sigma_s}{\sigma_a+\sigma_s} \quad (24)$$

As manifested in Eq. 24, the BTDF is a function of the thickness of the thickness detail map $\delta(X)+h$, and a plurality of constants, A, B, $\sigma_a$ and $\sigma_s$. Constants A and B, in one mode, are measured from visual data collected from a representative object, as is further described in the next section. Similarly, constants $\sigma_s$ and $\sigma_a$ represent the scattering and absorption coefficients, respectively, of the object, which also are derivable by measuring visual data collected from the representative object. Because each of these terms are constants, the BTDF can be rewritten as given by Eq. 25:

$$f_t(X) = \frac{1}{\pi}\rho_t(X) \quad (25)$$

In Eq. 25, $\rho_t(X)$ is the spatially variant transmittance of the object. Like the diffuse reflectance $\rho_d(A)$ of the diffuse term $f_d$ of the BRDF, the BTDF is dependent only on the position X within the plane of the object. Also like the diffuse reflectance $\rho_d(X)$, the transmittance $\rho_t(X)$ is obtainable from analysis of subsurface light transport, as described further below.

Diffuse Reflectance and Transmittance Derived from Subsurface Scattering

The diffuse reflectance $\rho_d(X)$ of the BRDF and the transmittance $\rho_t(X)$ are derivable from visual data captured from the object being modeled. Taking the example of a plant leaf, subsurface scattering analysis, in one mode of analysis, is based on a within-leaf radiative transfer model. One such model is LEAFMOD, an experimentally validated model proposed by Ganapol, Johnson, Hammer, Hlavka, and Peterson, in "LEAFMOD: A new within-leaf radiative transfer model," Remote Sensing of Environment 63, 182-193 (1998).

A radiative transfer equation is expressible as given by Eq. 26:

$$\Omega \cdot \nabla I(X, \Omega) + \sigma_t I(X, \Omega) = \sigma_s \int_{4\pi} d\Omega' p(\Omega', \Omega) I(X, \Omega') \quad (26)$$

In Eq. 26, $p(\Omega,\Omega')$ represents a general phase function given by Eq. 27:

$$(\vec{\omega} \cdot \vec{\nabla})I(x, \vec{\omega}) + \sigma_t L(x, \vec{\omega}) = \sigma_s(x) \int_{\Omega_{4\pi}} p(\vec{\omega}', \vec{\omega}) I(x, \vec{\omega}') d\vec{\omega}' \quad (27)$$

Also in Eq. 27, $\sigma_t$ is a scalar constant equal to a sum of scalar constants $\sigma_a$ and $\sigma_s$. Eq. 27 can be reexpressed in terms of radiance values as given by Eq. 28:

$$\left[\mu\frac{\partial}{\partial z} + \sigma_t\right]I(x, \mu) = \sigma_s \int_{-1}^{1} f(\mu', \mu) I(x, \mu') d\mu' \quad (28)$$

In Eq. 28, $I(z,\mu)$ is the radiance at z in direction $\mu=\cos\theta$, $\mu'=\cos\theta'$ and $f(\mu',\mu)$ is the azimuthal average of the general phase function $p(\Omega,\Omega')$ Using Eq. 27, the optical path length is represented by Eq. 29:

$$\tau = \sigma_t z \quad (29)$$

Furthermore, using a leaf model such as LEAFMOD, the leaf interior is assumed to be constituted from an isotropic material. Accordingly, the azimuthal average of the general phase function $f(\mu',\mu)$ is replaceable by the value 0.5. Accordingly, Eq. 28 can be simplified as given by Eq. 30:

$$\left[\mu\frac{\partial}{\partial \tau} + 1\right]I(\tau, \mu) = \frac{\omega}{2}\int_{-1}^{1} I(\tau, \mu') d\mu' \quad (30)$$

In Eq. 30, ω is equal to the ratio given by Eq. 31:

$$\omega = \frac{\sigma_s}{\sigma_t} \quad (31)$$

A light beam $\mu_0$ (FIG. 2) illuminating the upper surface 220 of the leaf slab 210 from a direction $\mu_0$ is assumed to be of unit strength, thus, the value of $\mu_0$ is equal to cos $\theta_0$. Further, for purposes of analyzing the subsurface light scattering, $\theta_0$ is assumed to be 0. This assumption is suitable because the reflectance and transmittance being analyzed are diffuse. Accordingly, the boundary conditions for the radiance is given by Eqs. 32 and 33:

$$I(0, \mu) = \delta(\mu - \mu_0), I(\Delta, -\mu) \quad (32)$$

$$I(0, \mu) = 2r_s \int_0^1 \mu' I(\Delta, \mu') d\mu' \quad (33)$$

In Eqs. 32 and 33, it is assumed that μ>0, Δ is the optical thickness defined as $\sigma_t h_0$ for a physical thickness of the leaf slab 210 of $h_0$. The value $r_s$ is the Lambertian reflectance of a surface adjacent to the back leaf surface.

Using the foregoing equations, the diffuse reflectance $\rho_s$ and the transmittance $\rho_t$ are given by Eqs. 34 and 35, respectively:

$$\rho_d = \int_0^1 \mu I(0, -\mu) d\mu \quad (34)$$

$$\rho_t = \int_0^1 \mu I(\Delta, -\mu) d\mu \quad (35)$$

In Eqs. 34 and 35, the values of $I(0,-\mu)$ and $I(\Delta,\mu)$ are obtainable by solving the boundary conditions of Eqs. 32 and 33 using an fn method known in the art. An example of the FN method is described by Siewert in "The fn method for solving radiative-transfer problems in plane geometry," Astrophysics and Space Science 58, 131-137 (1978). The FN method expands the exit radiances in a set of basic functions in the form of shifted Legendre polynomials represented by $\psi_a(\mu)$. Solving Eqs. 32 and 33, the diffuse reflectance $\rho_d(X)$ of the BRDF and the transmittance $\rho_t(X)$ are given by Eqs. 36 and 37, respectively:

$$\rho_d = \int_0^1 \mu \left[ I(\Delta, -\mu) e^{-\frac{\Delta}{\mu}} + \frac{\omega}{2} \sum_{a=0}^{N-1} a_n \Psi_n(\mu) \right] d\mu \quad (36)$$

$$\rho_t = \int_0^1 \mu \left[ I(\Delta, \mu) e^{-\frac{\Delta}{\mu}} + \frac{\omega}{2} \sum_{a=0}^{N-1} a_b \Psi_n(\mu) \right] d\mu \quad (37)$$

In Eqs. 36 and 37, $a_n$ and $b_n$ are constants determined by the FN method. N is an integer controlling the accuracy of the FN method. In one mode, N is chosen such that the solutions for $a_n$ and $b_n$ are within a relative error of $10^{-3}$.

In one mode, the reflectance and transmittance are measured with a linear light source device. A surface adjacent to the upper leaf surface 220 (FIG. 2) of the leaf slab 210 is made non-reflective by covering the light box with a diffuse dark gel. As a result, $r_s$ is approximately equal to zero. Two constants, A and B, are derived for substitution into Eqs. 35 and 36, as given by Eqs. 38 and 39, respectively:

$$A = \sum_{n=0}^{N-1} a_n \int_0^1 \mu \Psi_n(\mu) d\mu \quad (38)$$

$$B = \sum_{n=0}^{N-1} b_n \int_0^1 \mu \Psi_n(\mu) d\mu \quad (39)$$

Eqs. 38 and 39 yield constants because $a_n$ and $b_n$ are constants. Substituting for A and B as given by Eqs. 38 and 39 into Eqs. 36 and 37, solutions for reflectance $\rho_d(X)$ of the BRDF and the transmittance $\rho_t(X)$ are given by Eqs. 40 and 41, respectively:

$$\rho_d = \frac{A}{2} \frac{\sigma_s}{\sigma_a + \sigma_s} \quad (40)$$

$$\rho_t = e^{-(\sigma_a + \sigma_s) h_0} + \frac{B}{2} \frac{\sigma_s}{\sigma_a + \sigma_s} \quad (41)$$

Combining Eq. 39 with the spatially variant albedo map γ(X), reflectance $\rho_d(X)$ of the BRDF for any position on the leaf slab 210 (FIG. 2) is given by Eq. 42:

$$\rho_d(X) = \frac{A}{2} \frac{\sigma_a}{\sigma_a + \sigma_s} \gamma(X) \quad (42)$$

Similarly, combining Eq. 40 with the spatially variant thickness map δ(X), transmittance $\rho_t(X)$ of the BTDF is given by Eq. 42:

$$\rho_t(X) = e^{-(\sigma_a + \sigma_s)(h + \delta(X))} \frac{B}{2} \frac{\sigma_a}{\sigma_a + \sigma_s} \quad (43)$$

It should be noted that the reflectance $\rho_d(X)$ of the BRDF depends on the albedo map γ(X) but not the thickness map δ(X). Conversely, the transmittance $\rho_t(X)$ of the BTDF depends on the thickness map δ(X), but not on the albedo map γ(X).

Fitting BRDFs and BTDFs to Measured Data

In one mode, the reflectance and transmittance are measured with a linear light source device. Using the example of a leaf, two BRDF and BTDF pairs are acquired, including a BRDF and BTDF pair for the upper surface 220 (FIG. 2) of the leaf slab 210, and a BRDF and BTDF pair for the lower surface 230 of the leaf slab 210.

More specifically, for each surface, a diffuse lobe and a reflectance lobe are fitted to the reflectance data acquired using a uniform diffuse area light source, such as a linear light source device. For each surface, this process yields the diffuse reflectance $\rho_d(X)$, the specular intensity map $\rho_s(X)$, the specular roughness map m(X), and the transmittance $\rho_t(X)$.

From an estimated leaf thickness h and measured ρd(X) and ρt (X), $\sigma_a$, $\sigma_s$γ(X) and δ(X) are calculated. The values of $\sigma_a$ and $\sigma_s$ are calculated for every point (X) from Eqs. 40 and 41. Scalar constants $\sigma_a$ and $\sigma_s$ are averaged over each of the leaf surfaces. Once values of $\sigma_a$ and $\sigma_s$ have been determined, the albedo map γ(A) and the thickness map δ(X) are derived from the visual data captured using the linear light source device by solving Eqs. 42 and 43 for γ(X) and δ(X), respectively.

Recovering the parameters γ(X), δ(X), $\sigma_a$, and $\sigma_s$ using the process described in the previous paragraph provides two advantages. First, redundancy in the measured diffuse transmittance $\rho_t(X)$ makes the leaf model more compact. The measured $\rho_t(X)$ is stored in RGB channels. By contrast, δ(X) yields only grayscale values that can be stored in an alpha-channel of one of the texture maps needed for the BRDF parameters. Thus, no separate texture map is needed to store the BTDF. A second advantage is that meaningful editing of leaf appearance can be performed by adjusting parameters such as $\sigma_a$, $\sigma_s$, and the leaf thickness h from their estimated values. Changes to these values affect the overall appearance of the leaf without having to edit the rendered image of the leaf.

Process for Deriving Parametric Models from Measured Data

Figure 4:
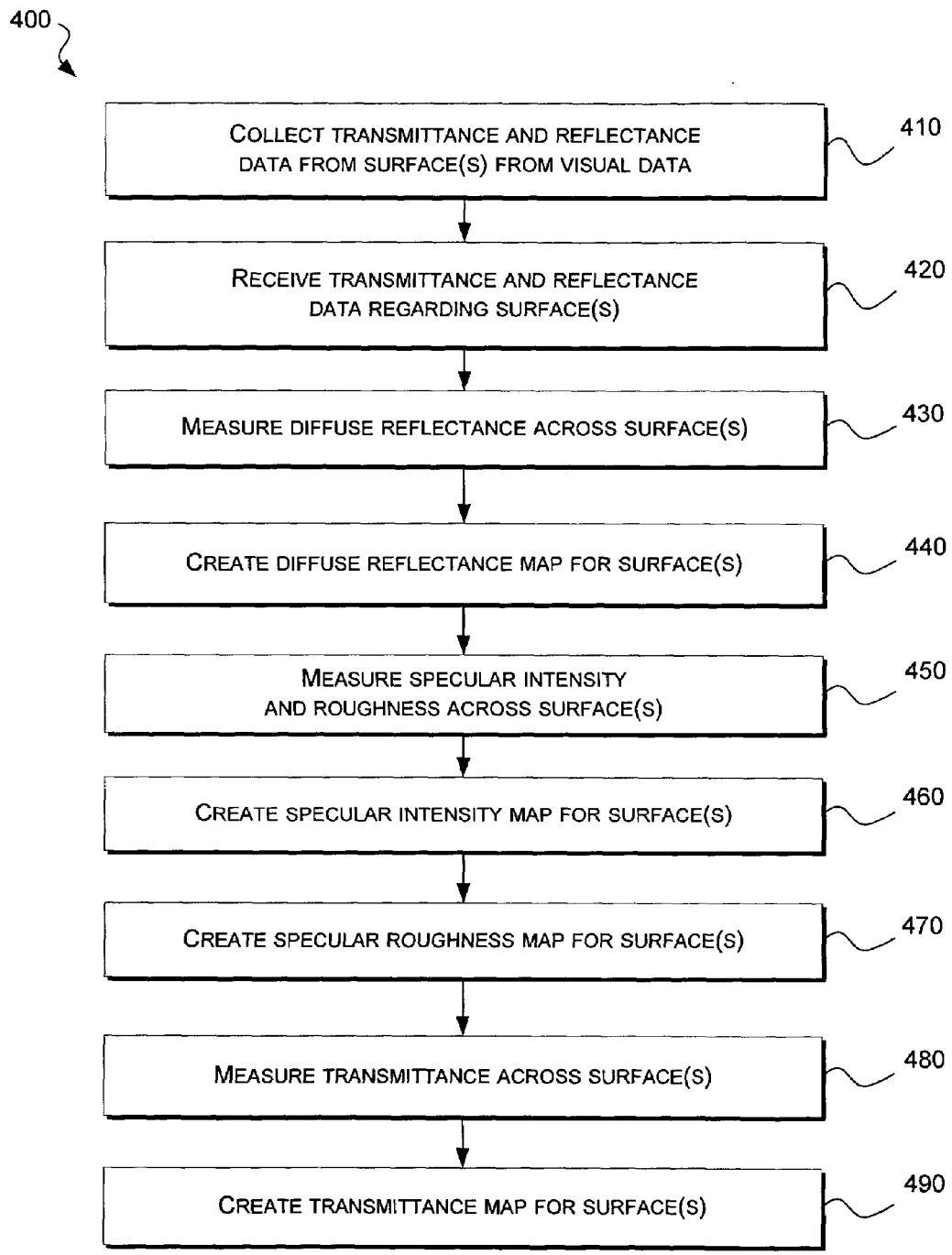
FIG. 4 is a flow diagram of a process for deriving characteristics from measurements of an object used to model the object.

FIG. 4 illustrates a process 400 for developing parametric models for representing an object using the equations previously derived. At 410, transmittance and reflectance data is collected from visual data of one or more surfaces of the object to be modeled. At 420, the transmittance and reflectance data is received for processing to derive the parametric models. At 430, the diffuse reflectance is measured across each of the surfaces and, at 440, a diffuse reflectance map is created collecting the diffuse reflectance values. At 450, the specular intensity and roughness are measured across each of the surfaces. At 460, a specular intensity map is created collecting the specular intensity values for the surfaces, and, at 470, a specular roughness map is created collecting the specular roughness value for the surfaces. At 480, transmittance is measured across the surfaces and, at 490, a transmittance map is created for the surfaces.

Figure 5:
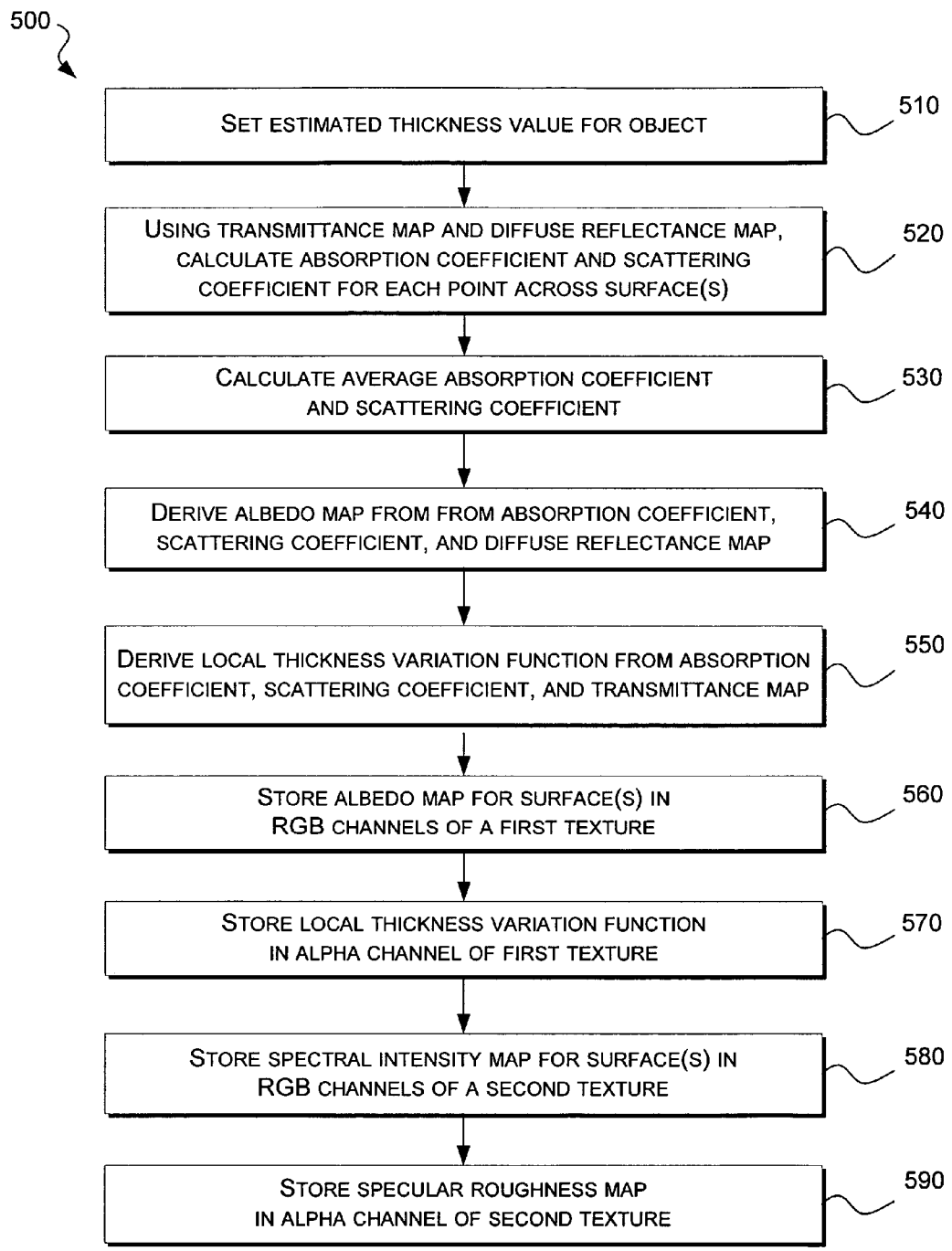
FIG. 5 is a flow diagram of a process for creating textures from the characteristics derived from measurements of the object.

FIG. 5 illustrates a process 500, using the equations previously derived and the maps created as described in FIG. 4, for creating textures from which the object can be rendered. At 510, an estimated thickness, h, is set for the object. The estimated thickness h is varied by the local thickness variation function δ(X). The estimated thickness h can be edited to allow for adjusting the appearance of the object.

At 520, using the transmittance map $\rho_t(X)$ and the diffuse reflectance map $\rho_r(X)$ an absorption coefficient $\sigma_a$ and a scattering coefficient $\sigma_s$ are calculated for each point on the surface(s) by solving the system of Eqs. 40 and 41 for $\sigma_a$ and $\sigma_s$. At 530, the values of $\sigma_a$ and $\sigma_s$ calculated for each point are averaged to derive scalar constants to be used for $\sigma_a$ and $\sigma_s$ across each of the surfaces.

At 540, the albedo map γ(X) is derived from the absorption and scattering coefficients derived at 530 and the diffuse reflectance map $\rho_r(X)$ using Eq. 42. At 550, the local thickness variation function δ(X) is calculated from the absorption and scattering coefficients derived at 530 and the transmittance map $\rho_t(X)$ using Eq. 43.

At 560, the albedo map γ(X) is stored for each of the surfaces in the red-green-blue channels of a first texture. At 570, the local thickness variation function δ(X) is stored in the alpha channel of the first texture. At 580, the spectral intensity map $\rho_s(X)$ is stored in the red-green-blue channels of a second texture. At 590, the specular roughness map m(X) is stored in the alpha channel of the second texture. The object will be rendered using these textures, as described below in connection with FIG. 12.

Lighting Computation to Facilitate Rendering of Objects

As mentioned previously with regard to FIG. 1, lighting computation is performed in a two-pass process to facilitate real-time rendering of objects with global illumination effects. Global illumination effects are desired to realistically represent objects by including effects of significant high frequency lighting without losing shadowing effects. The process extends the precomputed radiance transfer (PRT), which is known in the art and conventionally is used for low frequency illumination to precompute illumination for low frequency illumination and illumination from the sun, a multi-frequency illumination source that yields high frequency illumination for which PRT is not used.

In one mode, solar illumination is separated into direct and indirect components at each point on the surface of the object. Illumination of the object from the indirect component is determined in a first pass, and illumination of the object from the direct component is determined in a second pass. The two passes are performable in either order.

In the first pass, the indirect component and low frequency environmental light resulting from illumination other than solar illumination is performed using PRT. In the second pass, contribution of the direct component is determined using light visibility convolution data at a plurality of points from which solar illumination may be expected based on movement of the sun across the sky. The second pass does not use a low-order spherical harmonics basis used in conventional PRT. Accordingly, there is no loss of high-frequency details that would result if conventional PRT is applied to high-frequency illumination sources. The sum of the two passes results in the overall illumination of the object.

Sources of illumination are represented by a source lighting vector l given by Eq. 44:

$$l = S + E \tag{44}$$

In Eq. 44, S represents sunlight, the high frequency illumination, while E represents lower frequency environmental light. PRT is used to precompute and store a linear operator $M_P$ at every surface point P for which illumination is to be computed, where P represents the coordinate position of a point in multi-dimensional space. The linear operator Mp transforms a source lighting vector l into a transferred incident radiance vector, as given by Eq. 45:

$$l^T(p) = M_P l \tag{45}$$

Linear operator $M_p$ attenuates the source lighting as a function of shadowing at the point P caused by other objects, but also increases source lighting as a result of reflections. $M_P$ is a linear operator, thus, $l^T(P)$ is expressible as given by Eqs. 46 and 47:

$$l^T(p) = M_P(S + E) \tag{46}$$

$$l^T(p) = S^T(P) + E^T(P) \tag{47}$$

To capture high frequency detail details of soft shadows resulting from sunlight, the transferred sunlight radiance $S^T(P)$ is separated into direct and indirect components, respectively, as given by Eq. 48:

$$S^T(P) = S_d^T(P) + S_i^T(P) \tag{48}$$

$S_d^T(P)$ includes all direct sunlight illumination at point P. $S_i^T(P)$ includes all indirect sunlight illumination at point P, including all sunlight transmitted through other objects and sunlight reflected onto point P by other objects. Again, because $M_P$ is a linear operator, $l^T(P)$ is expressible as given by Eq. 49:

$$l^T(p) = S_d^T(P) + S_i^T(P) + E^T(P) \tag{49}$$

In one mode, $M_p$ is precomputed using a ray tracer in which both BRDF and BTDF are evaluated at each surface point.

Evaluating BRDF and BTDF at each point accounts for the translucency of the leaves, resulting in an exit radiance at each point P for each view direction $v_P$. The exit radiance $e(P, v_P)$ for each point is computed as a dot product given by Eq. 50:

$$e(P,v_P)=b(v_P)l^T(P) \tag{50}$$

In Eq. 50, $b(v_P)$ is a view-dependent BRDF-BTDF vector. Substituting the value of $l^T(P)$ from Eq. 49 into Eq. 50, the exit radiance $e(P, v_P)$ can be reexpressed as given by Eq. 51:

$$e(P,vp)=b(vp)S_d^T(P)+b(vp)S_i^T(P)+b(vp)E^T(P) \tag{51}$$

Because PRT is usable to represent low frequency light, it is desirable to rewrite Eq. 51 to isolate the low frequency illumination components as given by Eq. 52:

$$e(P,vp)=b(vp)S_d^T(P)+b(vp)(S_i^T(P)+E^T(P)) \tag{52}$$

The illumination from low frequency terms $S_i^T(P)+E^T(P)$ are obtained from PRT. E is assumed to be a low frequency illumination component. For sunlight, an inherent limitation of PRT is that only captures low frequency inter-reflections of illumination. Thus, conventional PRT is used to derive the illumination from the low frequency terms $S_i^T(P)+E^T(P)$.

The only modification to PRT is that only indirect components of the transferred sunlight radiance are recorded. This is a simple modification because the transfer operator $M_P$ is pre-computed using a ray tracer. Direct sunlight illumination represents the first light bounce of the ray tracer and, thus, is easily disregarded. Thus, PRT projects $M_P$, S, and E on a low-order spherical harmonics basis, thus only low frequency visual effects are yielded by $S_i^T(P)+E^T(P)$. PRT is thus used to perform the first lighting computation pass.

Omitting the low frequency components from Eq. 52, only the high frequency components of the exit radiance $e(P, v_P)$ remains, as given by Eq. 53:

$$e(P,vp)=b(vp)S_d^T(P) \tag{53}$$

For the second, high frequency lighting computation pass, it is desirable to compute the value of $b(vp)S_d^T(P)$ without using a low order spherical harmonics basis, which would attenuate some of the desired visual effects from the high frequency illumination.

By definition, where Y is the vector position of the sun and $S_d(Y)$ is the direct sunlight as a function of the vector position of the sun, $b(vp)S_d^T(P)$ can be expressed as given in Eq. 54:

$$b(v_P)S_d^T(P) = \int_\Omega f_r(Y, v_P)S_d(Y)V(P, Y)Y_Z dY \tag{54}$$

In Eq. 54, $f_r(Y, v_P)$ is the BRDF, V(P,Y) is the visibility function of the sun at P, $Y_z$ is the z component of Y, and $\Omega$ is the hemisphere of light directions from which the illumination of the sign may be received.

Calculating $b(vp)S_d^T(P)$ from Eq. 54 is a computationally involved calculation that would be impractical to calculate. However, instead of calculating the expression of Eq. 54, light-visibility convolution is computed for all vertices in the scene from where the sunlight may issue. Precomputing the light visibility convolution thereby facilitates real-time rendering of objects.

Light visibility convolution is performed by modeling the sun as an area light source in the shape of a flat, circular disk. Term $\Omega_0$ is a solid angle extending from the sun to point P, the point being analyzed. $S_d(Y)$ is only nonzero when it falls within the angle $\Omega_0$. Because the sun is very far away, the angle $\Omega_0$ is very small. As a result, Eq. 54 can be reexpressed as given by Eq. 55:

$$b(vp)S_d^T(P) \approx f_r(Y,vp)V_{Y_0}(P) \tag{55}$$

where the function $V_{Y_0}(P)$ is given by Eq. 56:

$$V_{Y_0}(P) = \int_{\Omega_0} S_d(Y)V(P, Y)Y_Z dY \tag{56}$$

$V_{Y_0}(P)$ represents the light visibility convolution integral at P. $V_{Y_0}(P)$ effectively is a shadow factor that accounts for the illumination at P by the area light source with which the sun is modeled. In Eq. 55, the BRDF, $f_r(Y, vp)$ can be regarded as a constant with the angle $\Omega_0$.

Figure 6:
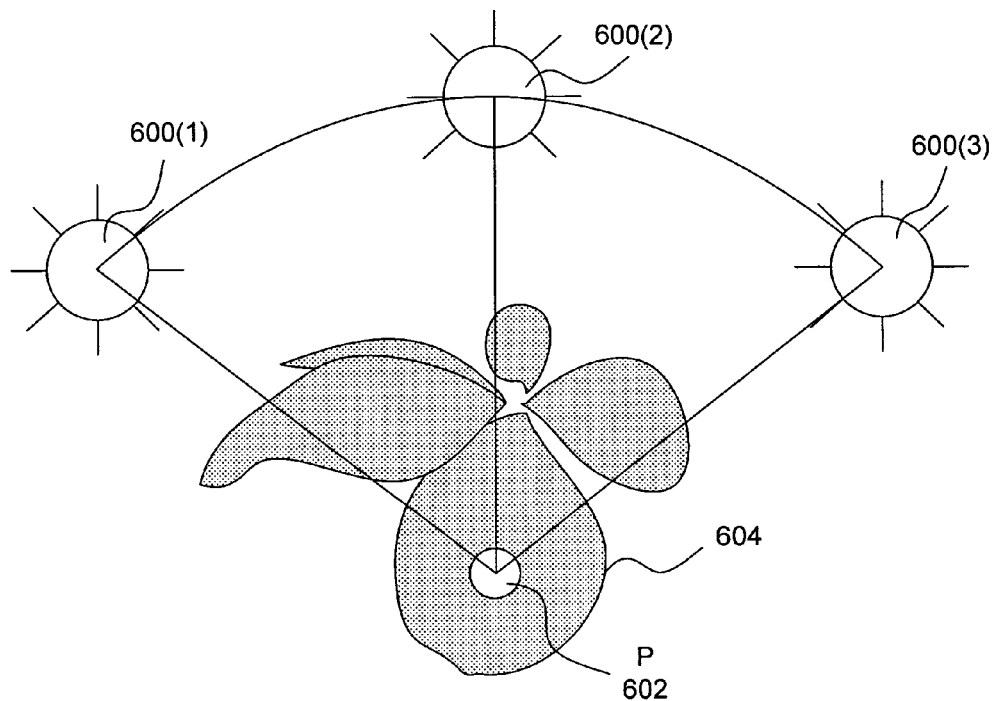
FIG. 6 is map representing how illumination from a high frequency illumination source such as the sun is modeled as a disk generating light in a narrow angle in a light visibility convolution integral.
Figure 7:
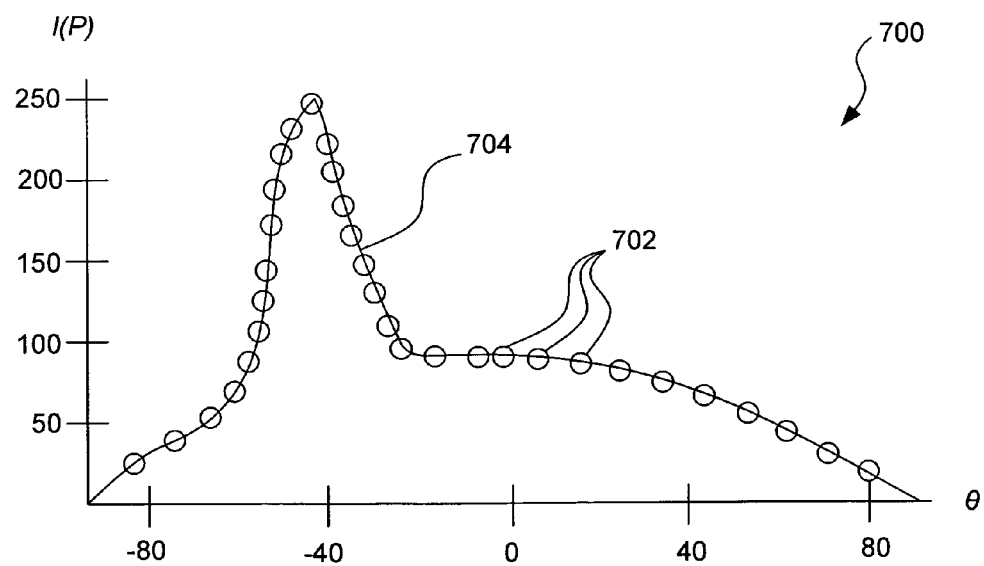
FIG. 7 is graph comparing the modeling a high frequency illumination to a ground truth represented by ray tracing.

FIGS. 6 and 7 illustrate how modeling the sun or another high frequency light source is effectively modeled by the light visibility convolution integral. In FIG. 6, the sun is modeled as a flat disk 600(1), 600(2) and 600(3) at various positions moving across the sky. From each of points 600(1), 600(2) and 600(3), a selected point P 602 on a leaf 604 is illuminated.

FIG. 7 shows the accuracy of the approximation of the light visibility convolution integral. FIG. 7 is a graph 700 comparing ground truth measurements represented by circles 702 as compared to a curve 704 representing results of the light visibility convolution integral. As can be seen from FIG. 7, treating the high frequency light source as a flat disk for which the value of $S_d(Y)$ is only nonzero inside $\Omega_0$, the approximation of the light convolution integral tracks the ground truth very closely.

The light visibility convolution $V_{Y_0}(P)$ is calculated for each point P for each given sunlight direction Y. The collection of results of the light visibility convolution $V_{Y_0}(P)$ for each point for each given sunlight direction Y is a light visibility map $V_{Y_0}$. The light visibility maps are precomputed and stored. Thus, at runtime, when objects being illuminated are rendered, the illumination can be calculated quickly using the light visibility maps and the BRDF according to Eq. 55.

More specifically, the light visibility maps $V_{Y_0}$ are precomputed by calculating the light visibility convolution value $V_{Y_0}(P)$ for each point P and for each sunlight direction Y. The light visibility convolution value is rebinned for each sunlight direction Y to obtain the light visibility map $V_{Y_0}$. For each point P and each sunlight direction, evaluation of $V_{Y_0}(P)$ can be considered a ray casting process, where a set of rays are cast from the disk representing the sun to point P, and the contribution of each ray to the light visibility convolution integral is calculated using $S_d(Y)$ and the sun visibility at P. The final value of the light visibility convolution integral is the sum of the contributions of all the cast rays.

Process for Computing Illumination

Figure 8:
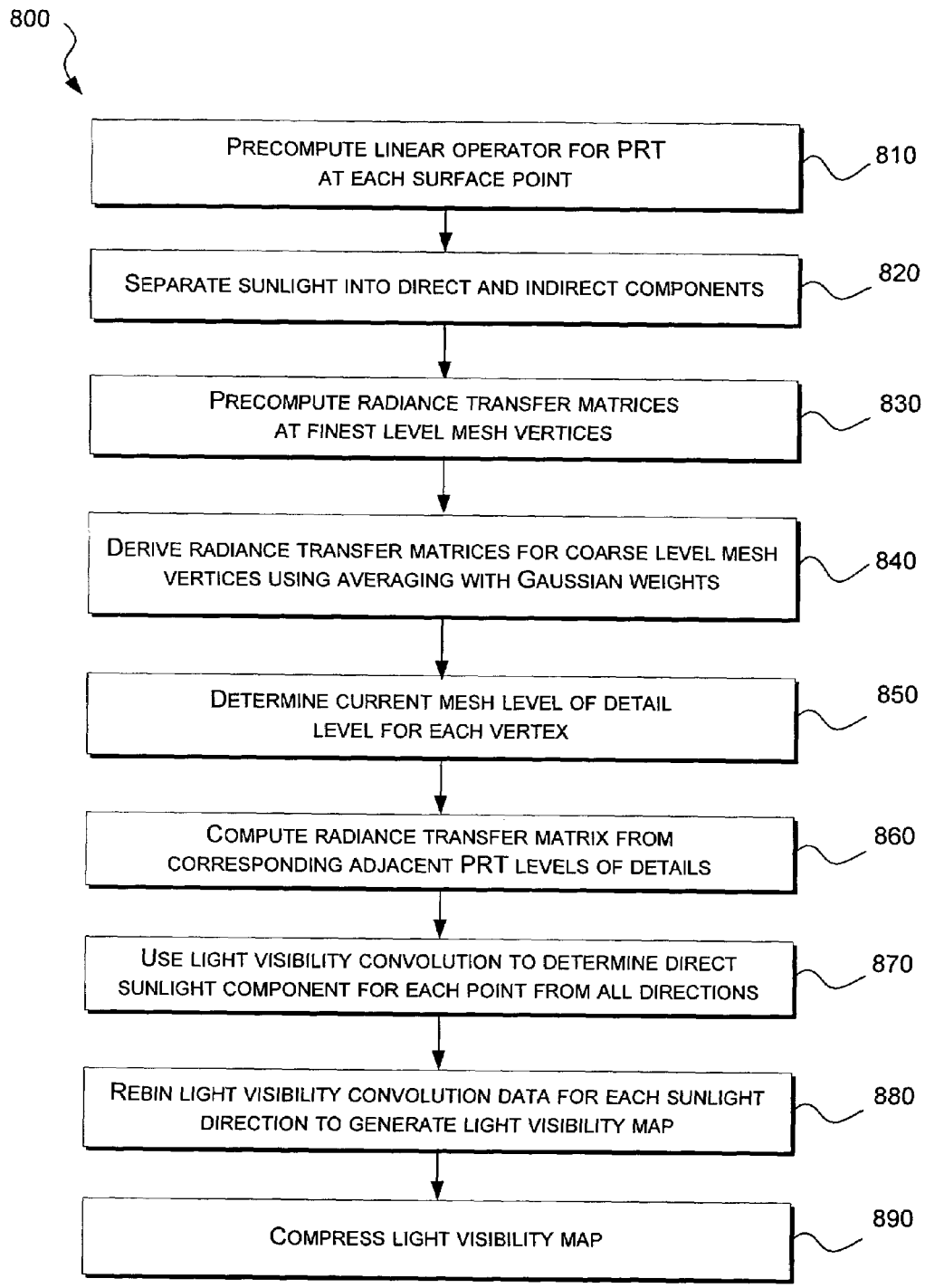
FIG. 8 is a flow diagram of a process for illuminating objects.

FIG. 8 illustrates a process 800 for computing illumination for a scene in which objects are illuminated by direct sunlight, indirect sunlight, and other low frequency environmental lighting using the equations previously derived. At 810, a linear operator $M_P$ is precomputed for each surface point to be illuminated. At 820, sunlight is separated into direct and indirect components. As previously described, precomputed radiance transfer (PRT) is suitable for rapid calculation of contributions of low frequency illumination, but not for high frequency illumination. Thus, according to one more, high frequency illumination, such as that provided by direct sunlight, is separately calculated as described below at 870.

According to one mode, the PRT rendering pass is accelerated by creating a discrete geometry level of detail for each leaf mesh and deriving radiance transfer matrices for all level of detail meshes. At 830, radiance transfer matrices are precomputed for the finest level of mesh vertices that would be presented at the highest possible resolution for the object. At 840, radiance transfer matrices for coarse level vertices used for representing the object at a lower resolution are derived. The radiance transfer matrices for the coarse level vertices are derived by averaging the radiance transfer matrices at the finest level mesh matrices derived at 830. The finest level mesh matrices are averaged using Gaussian weights as will be understood by those skilled in the art. At 850, the current level of detail for each vertex is determined, and the appropriate radiance transfer matrix is selected. At 860, the radiance transfer matrix is computed from adjacent precomputed radiance transfer levels of detail.

At 870, the light visibility convolution integral is used to determine the direction sunlight component for each point in the scene for all possible sun directions. At 880, to reduce the size of the light visibility map, the light visibility convolution integral data is rebinned to create the light visibility map for each sun position. At 890, the light visibility map is compressed, such as by using a run length encoding scheme. The light visibility maps for each sun position are separately compressed so that only one sun visibility map is decompressed for each scene, because only one sun position will be used for each scene.

Alternative Computation of Light Visibility Convolution

Because the visibility map $V_{Y_0}$ is precomputed, extensive processing can be performed to facilitate accurate light computation without negatively affecting subsequent runtime performance. However, $V_{Y_0}(P)$ can be computed for all sunlight directions efficiently using cube maps to expedite the preprocessing of the light visibility convolution data.

FIG. 9 shows a mesh 900 of a group of leaves for which computation of illumination is to be performed. More specifically, illumination will be calculated for point P 902.

FIG. 10 shows a cube map generated about point P 902 (FIG. 9). FIG. 11 shows a light mask 1100. The light mask 1100 includes a blank, null area 1100 except for the light source 1104. The light source 1104 is represented as a flat disk at position Y, as previously described with regard to the use of the light visibility convolution integral. Position of the light source 1104 represents the position in space of the lights source relative to a cube map, just as cube map represents position of other objects in space around the point of interest.

Combining cube map 1000 and light mask 1100 generates the same result as the light visibility convolution integral. Thus, taking the pixel-wise dot product of cube map 1000 and light mask 1100 provides an efficient method for calculating the light visibility convolution integral, $S_0(Y)V(P,Y)$.

Process for Rending an Object with Global Illumination Effects

Figure 12:
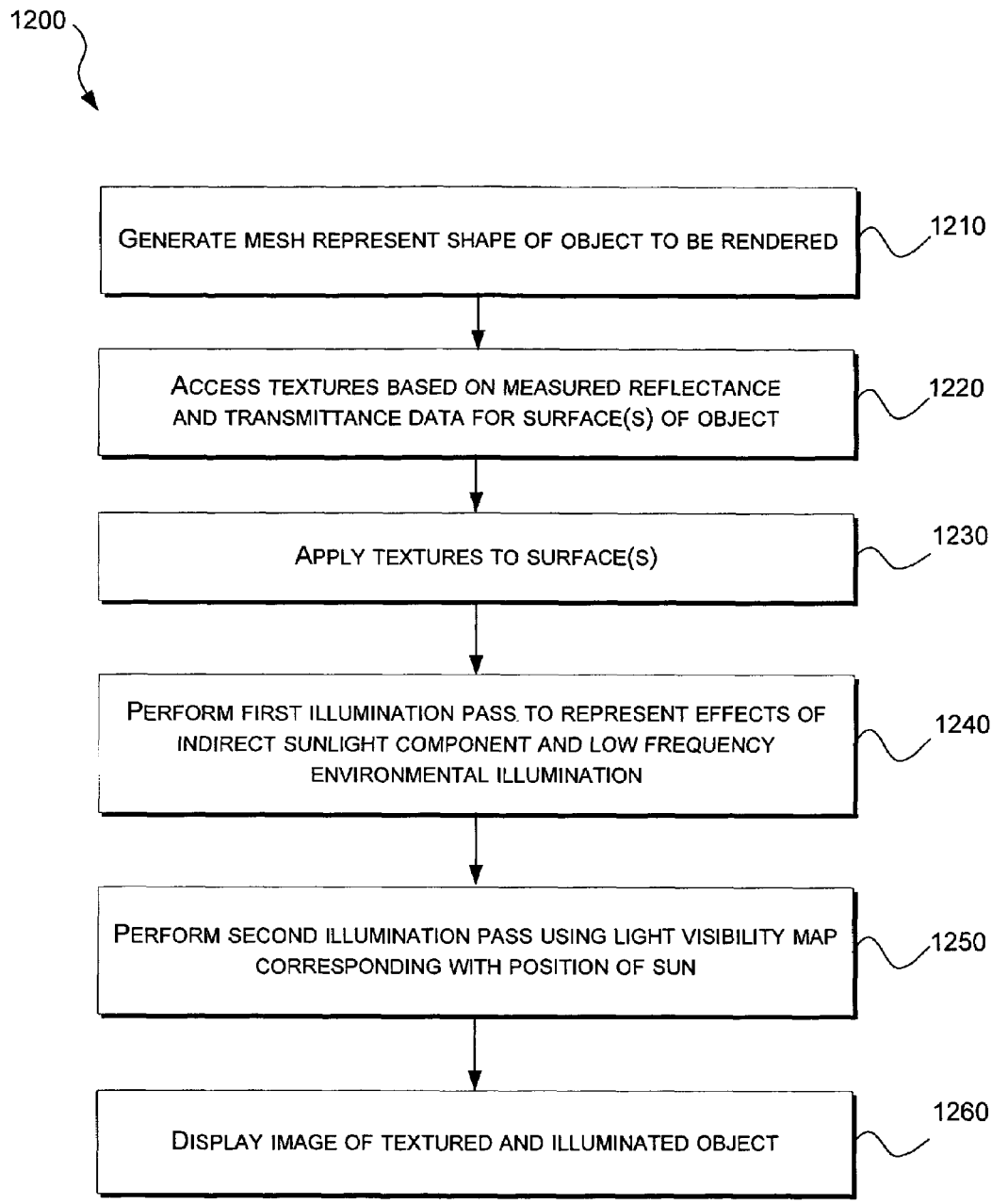
FIG. 12 is a flow diagram for rendering an object using textures and illumination calculations as previously described in connection with FIGS. 4, 5, and 11.

FIG. 12 shows a process 1200 by which a partially translucent object can be rendered from measured reflectance and transmittance data, and illuminated to accurately reflect low frequency and high frequency illumination components.

At 1210, a mesh representing the shape of the object to be rendered is generated. At 1220, textures are accessed to apply to the surfaces of the objects being rendered. As previously described, in one mode the textures include specular intensity and roughness maps, an albedo map, and a local thickness variation function. At 1230, the textures are applied. At 1240, a first illumination pass is performed to represent the effects of indirect sunlight and other low frequency environmental illumination. As previously described, precomputed radiance transfer is well-suited for rapid computation for low frequency light. At 1250, a second illumination pass is performed to represent the effects of direct sunlight for which precomputed radiance transfer is not an ideal method. The second pass uses a light visibility map derived using the light visibility convolution integral. At 1260, the image of the textured and illuminated object is displayed.

Although this description frequently has referred to the example of plant leaves as the objects being modeled, and sunlight as a high frequency illumination source, other objects can be modeled and other light sources can be used. Other translucent bodies, such as panes of glass or plastic used in windows and other objects can be modeled using the transmittance and reflectance data previously described. Similarly, in an environment with other high frequency light sources, such as high intensity manmade lights, or an environment with multiple suns or other high intensity light sources, the two-pass process and the light visibility convolution integral can be used to compute illumination for these situations, as well.

Computing System for Implementing Exemplary Embodiments

Figure 13:
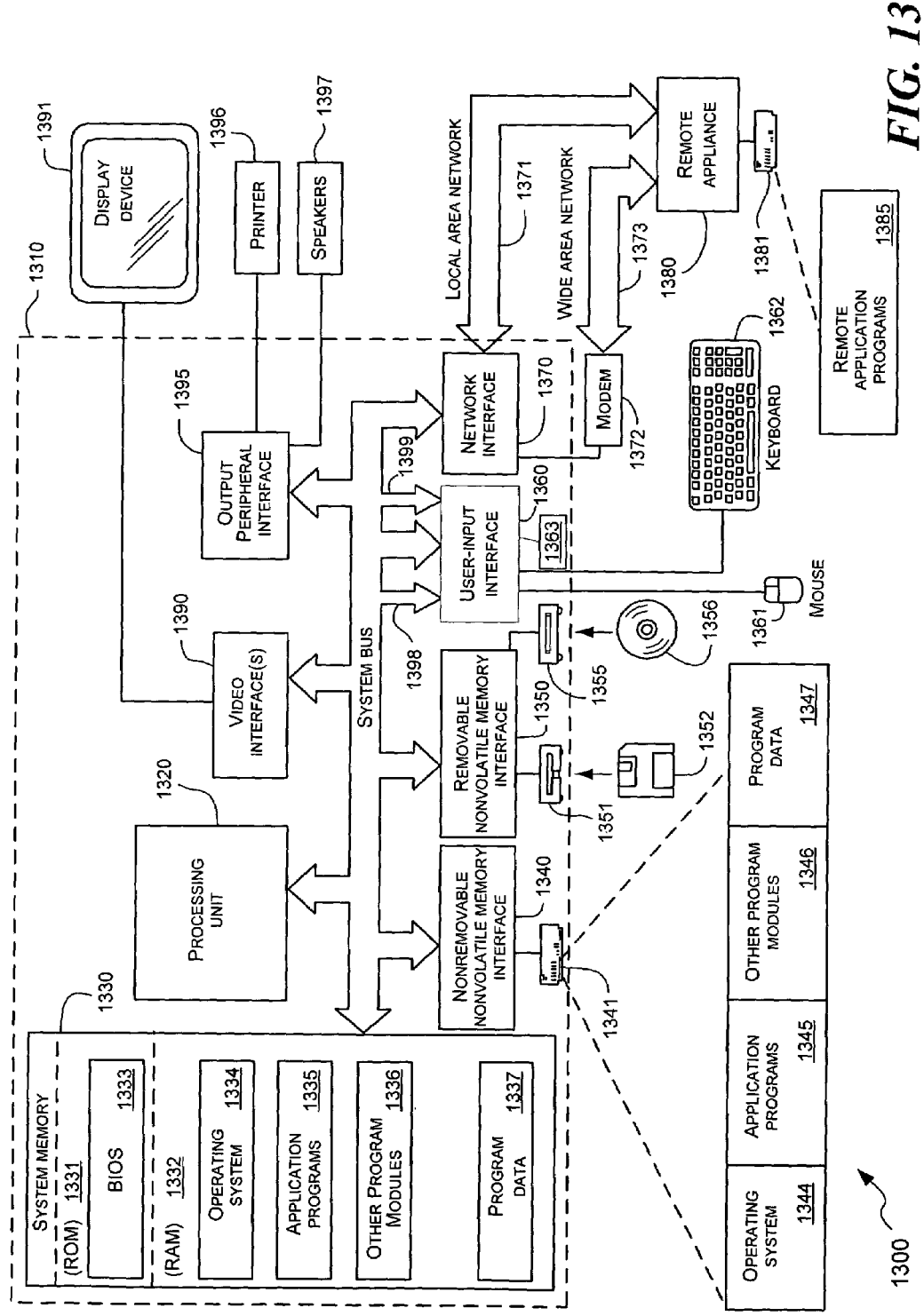
FIG. 13 is a block diagram of a computing-system environment suitable for use with encoding or decoding data according to modes of the present invention.

FIG. 13 illustrates an exemplary computing system 1300 for implementing embodiments of object modeling and illumination calculation processes. The computing system 1300 is only one example of a suitable operating environment and is not intended to suggest any limitation as to the scope of use or functionality of exemplary embodiments of the object modeling and illumination calculation processes previously described or other embodiments. Neither should the computing system 1300 be interpreted as having any dependency or requirement relating to any one or combination of components illustrated in the exemplary computing system 1300. In addition, it will be appreciated that a system such as the computing system 1300 may be used for modeling objects, precomputing illumination, and/or rendering and determining illumination of objects at runtime.

The object modeling and illumination calculation processes may be described in the general context of computer-executable instructions, such as program modules, being executed on computing system 1300. Generally, program modules include routines, programs, objects, components, data structures, etc., that perform particular tasks or implement particular abstract data types. Moreover, those skilled in the art will appreciate that the object rendering and illumination calculation processes may be practiced with a variety of computer-system configurations, including gaming systems, hand-held devices, multiprocessor systems, microprocessor-based or programmable-consumer electronics, minicomputers, mainframe computers, and the like. The object modeling and illumination calculation processes may also be practiced in distributed-computing environments where tasks are performed by remote-processing devices that are linked through a communications network. In a distributed-computing environment, program modules may be located in both local and remote computer-storage media including memory-storage devices.

With reference to FIG. 13, an exemplary computing system 1300 for implementing object modeling and illumination calculation processes includes a computer 1310 including a processing unit 1320, a system memory 1330, and a system bus 1321 that couples various system components including the system memory 1330 to the processing unit 1320.

Computer 1310 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 1310. The system memory 1330 includes computer-storage media in the form of volatile and/or nonvolatile memory such as ROM 1331 and RAM 1332. A Basic Input/Output System 1333 (BIOS), containing the basic routines that help to transfer information between elements within computer 1310 (such as during start-up) is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/nonremovable, volatile/nonvolatile computer-storage media. By way of example only, FIG. 13 illustrates a hard disk drive 1341 that reads from or writes to nonremovable, nonvolatile magnetic media, a magnetic disk drive 1351 that reads from or writes to a removable, nonvolatile magnetic disk 1352, and an optical-disc drive 1355 that reads from or writes to a removable, nonvolatile optical disc 1356 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 1341 is typically connected to the system bus 1321 through a nonremovable memory interface such as interface 1340. Magnetic disk drive 1351 and optical dick drive 1355 are typically connected to the system bus 1321 by a removable memory interface, such as interface 1350.

The drives and their associated computer-storage media discussed above and illustrated in FIG. 13 provide storage of computer-readable instructions, data structures, program modules and other data for computer 1310. For example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Typically, the operating system, application programs, and the like that are stored in RAM are portions of the corresponding systems, programs, or data read from hard disk drive 1341, the portions varying in size and scope depending on the functions desired. Operating system 1344, application programs 1345, other program modules 1346, and program data 1347 are given different numbers here to illustrate that, at a minimum, they can be different copies. A user may enter commands and information into the computer 1310 through input devices such as a keyboard 1362; pointing device 1361, commonly referred to as a mouse, trackball or touch pad; a wireless-input-reception component 1363; or a wireless source such as a remote control. Other input devices (not shown) may include a microphone, joystick, game pad, satellite dish, scanner, or the like. These and other input devices are often connected to the processing unit 1320 through a user-input interface 1360 that is coupled to the system bus 1321 but may be connected by other interface and bus structures, such as a parallel port, game port, IEEE 1394 port, or a universal serial bus (USB) 1398, or infrared (IR) bus 1399. As previously mentioned, input/output functions can be facilitated in a distributed manner via a communications network.

A display device 1391 is also connected to the system bus 1321 via an interface, such as a video interface 1390. Display device 1391 can be any device to display the output of computer 1310 not limited to a monitor, an LCD screen, a TFT screen, a flat-panel display, a conventional television, or screen projector. In addition to the display device 1391, computers may also include other peripheral output devices such as speakers 1397 and printer 1396, which may be connected through an output peripheral interface 1395.

The computer 1310 will operate in a networked environment using logical connections to one or more remote computers, such as a remote computer 1380. The remote computer 1380 may be a personal computer, and typically includes many or all of the elements described above relative to the computer 1310, although only a memory storage device 1381 has been illustrated in FIG. 13. The logical connections depicted in FIG. 13 include a local-area network (LAN) 1371 and a wide-area network (WAN) 1373 but may also include other networks, such as connections to a metropolitan-area network (MAN), intranet, or the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the network interface 1370, or other appropriate mechanism. Modem 1372 could be a cable modem, DSL modem, or other broadband device. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are exemplary, and other means of establishing a communications link between the computers may be used.

Although many other internal components of the computer 1310 are not shown, those of ordinary skill in the art will appreciate that such components and the interconnections are well-known. For example, including various expansion cards such as television-tuner cards and network-interface cards within a computer 1310 is conventional. Accordingly, additional details concerning the internal construction of the computer 1310 need not be disclosed in describing exemplary embodiments of the object modeling and illumination calculation processes.

When the computer 1310 is turned on or reset, the BIOS 1333, which is stored in ROM 1331, instructs the processing unit 1320 to load the operating system, or necessary portion thereof, from the hard disk drive 1341 into the RAM 1332. Once the copied portion of the operating system, designated as operating system 1344, is loaded into RAM 1332, the processing unit 1320 executes the operating system code and causes the visual elements associated with the user interface of the operating system 1334 to be displayed on the display device 1391. Typically, when an application program 1345 is opened by a user, the program code and relevant data are read from the hard disk drive 1341 and the necessary portions are copied into RAM 1332, the copied portion represented herein by reference numeral 1335.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A method for creating a set of parameter maps representing a surface of a partially translucent object, comprising:
    receiving data measuring reflectance and transmittance of light received at the surface of the partially translucent object;
    fitting a parametric model to the data;
    using the parametric model to generate the set of parameter maps for a computing system to render an image of the surface of the partially translucent object;
    gathering the reflectance data and the transmittance data from the surface including illuminating the surface with a uniform diffuse area light source;
    measuring a specular intensity for each of a plurality of points across the surface;
    wherein the parametric model includes:
        a bidirectional reflectance distribution function including:
            a diffuse reflectance term dependent on spatial position relative to the surface; and
            a glossy term dependent on spatial position relative to the surface and angles of incidence and reflectance of at least one light source; and
        a bidirectional transmittance distribution function including a diffuse transmittance term depending on spatial position relative to the surface;
    wherein the data includes at least one of:
        a diffuse reflectance;
        a specular intensity;
        a specular roughness; and
        a transmittance;
    calculating from the diffuse reflectance, the transmittance, and an estimated thickness:
        an absorption coefficient; and
        a scattering coefficient;
    wherein the parameter maps include at least one of:
        an albedo map derived from the glossy term of the bidirectional reflectance distribution function, the absorption coefficient, and the scattering coefficient;
        a local thickness variation map derived from the bidirectional transmittance distribution function, the absorption coefficient and the scattering coefficient;
        a specular roughness map derived from the data measured; and
        a specular intensity map derived from the diffuse term of the bidirectional reflectance distribution function, the specular roughness map and the data measured from the surface; and
    wherein the parameter maps are stored in a pair of red-green-blue-alpha textures, wherein:
        the albedo map is stored in red-green-blue channels of a first texture;
        the specular intensity map is stored in red-green-blue channels of a second texture;
        the specular roughness map is stored in an alpha channel of one of the first texture and the second texture; and
        the local thickness variation map is stored in an opposite alpha channel in one of the first texture and the second texture in which the specular roughness map is not stored.

2. A method of claim 1, wherein the partially translucent object includes a plant leaf having an upper surface and a lower surface such that an upper surface graphical model is generated for the upper surface and a lower surface graphical model is generated for the lower surface.

3. A computer-readable storage medium having computer instructions embodied thereon for executing the method of claim 1.

4. A computer-implemented method for creating a set of parameter maps representing a surface of a partially translucent object, comprising:
    receiving data measuring reflectance and transmittance of light received at the surface of the partially translucent object;
    fitting a parametric model to the data, wherein the parametric model comprises:

$$f_r(X, \theta_i, \varphi_i, \theta_r, \varphi_r) = \frac{\rho_S(X)}{\cos\theta_i \cos\theta_r \cos^4\alpha} \cdot \frac{\exp\left(\frac{-\tan^2\alpha}{m(X)^2}\right)}{4\pi m(X)^2} + \frac{A}{2\pi} \frac{\sigma_S}{\sigma_a + \sigma_S} \gamma(X);$$

wherein $f_r$ is a bidirectional reflectance distribution function, X is a position within a plane of an object, $\theta_j$ is a vertical angle of incidence, $\phi_j$ is a horizontal angle of incidence, $\theta_r$ is a vertical angle of incidence and $\phi_r$ is a horizontal angle of reflectance, $m(X)$ is a spatially variant function defining a specular roughness map, $\sigma_s$ is a scattering coefficient, $\sigma_a$ is an absorption coefficient, $\rho_s(X)$ is a spatially variant specular intensity map, A is a visual data constant measured from a representative object, and $\gamma(X)$ is an albedo map, and $\alpha$ is an angle between a half-vector and a normal, wherein the normal is normal to the surface of the partially translucent object, wherein the half-vector bisects an angle between a vector extending between a source of illumination and the surface of the partially translucent object and a vector representing a direction of light reflection from the surface of the partially translucent object;
    using the parametric model to generate the set of parameter maps on a computing system to render an image of the surface of the partially translucent object; and
    gathering the reflectance data and the transmittance data from the surface including illuminating the surface with a uniform diffuse area light source.

5. A computer-implemented method of claim 4, wherein the partially translucent object includes a plant leaf having an upper surface and a lower surface such that an upper surface graphical model is generated for the upper surface and a lower surface graphical model is generated for the lower surface.

6. A computer-implemented method of claim 4, wherein the parametric model includes:
    a bidirectional reflectance distribution function including:
        a diffuse reflectance term dependent on spatial position relative to the surface; and
        a glossy term dependent on spatial position relative to the surface and angles of incidence and reflectance of at least one light source; and
    a bidirectional transmittance distribution function including a diffuse transmittance term depending on spatial position relative to the surface.

7. A computer-implemented method of claim 6, wherein the data includes at least one of:
   a diffuse reflectance;
   a specular intensity;
   a specular roughness; and
   a transmittance.

8. A computer-implemented method of claim 7, further comprising calculating from the diffuse reflectance, the transmittance, and an estimated thickness:
   an absorption coefficient; and
   a scattering coefficient.

9. A computer-implemented method of claim 8, wherein the parameter maps include at least one of:
   an albedo map derived from the glossy term of the bidirectional reflectance distribution function, the absorption coefficient, and the scattering coefficient;
   a local thickness variation map derived from the bidirectional transmittance distribution function, the absorption coefficient and the scattering coefficient;
   a specular roughness map derived from the data measured; and
   a specular intensity map derived from the diffuse term of the bidirectional reflectance distribution function, the specular roughness map and the data measured from the surface.

10. A computer-implemented method of claim 9, wherein the parameter maps are stored in a pair of red-green-blue-alpha textures, wherein:
    the albedo map is stored in red-green-blue channels of a first texture;
    the specular intensity map is stored in red-green-blue channels of a second texture;
    the specular roughness map is stored in an alpha channel of one of the first texture and the second texture; and
    the local thickness variation map is stored in an opposite alpha channel in one of the first texture and the second texture in which the specular roughness map is not stored.

11. A computer-implemented method of claim 4, wherein the gathering of the reflectance data and the transmittance data from the surface further includes at least one of:
    disposing a light sensor to capture light from the surface; and
    illuminating the surface with a light source including a linear light source; and
    measuring for each of a plurality of points across the surface at least one illumination response including at least one of:
       a diffuse reflectance;
       a specular intensity;
       a specular roughness; and
       a transmittance.

12. A computer-readable storage medium having computer instructions embodied thereon for executing the method of claim 4.

* * * * *